United States Patent
Dharmadhikari et al.

(10) Patent No.: US 12,432,632 B1
(45) Date of Patent: *Sep. 30, 2025

(54) SYSTEMS AND METHODS FOR ENHANCED CELLULAR NETWORK HANDOVERS

(71) Applicant: CABLE TELEVISION LABORATORIES, INC., Louisville, CO (US)

(72) Inventors: Omkar Shripad Dharmadhikari, Centennial, CO (US); Mu Xu, Shoreline, WA (US); Bernardo Huberman, Palo Alto, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,172

(22) Filed: Jan. 26, 2024

Related U.S. Application Data

(63) Continuation of application No. 17/525,368, filed on Nov. 12, 2021, now Pat. No. 11,889,369.

(60) Provisional application No. 63/112,761, filed on Nov. 12, 2020, provisional application No. 63/154,022, filed on Feb. 26, 2021.

(51) Int. Cl.
*H04W 36/00* (2009.01)
*H04W 36/08* (2009.01)
*H04W 36/14* (2009.01)

(52) U.S. Cl.
CPC ....... *H04W 36/0085* (2018.08); *H04W 36/08* (2013.01); *H04W 36/14* (2013.01)

(58) Field of Classification Search
CPC .. H04W 36/0085; H04W 36/08; H04W 36/14
See application file for complete search history.

(56) References Cited

U.S. PATENT DOCUMENTS

| | | | |
|---|---|---|---|
| 11,889,369 B1 * | 1/2024 | Dharmadhikari | H04W 36/14 |
| 2016/0014648 A1 | 1/2016 | Hamilton et al. | |
| 2017/0188286 A1 | 6/2017 | Yonekura et al. | |
| 2020/0178137 A1 | 6/2020 | Hussein et al. | |
| 2022/0201584 A1 | 6/2022 | Piriou et al. | |

* cited by examiner

*Primary Examiner* — Justin Y Lee
(74) *Attorney, Agent, or Firm* — Lathrop GPM LLP

(57) ABSTRACT

A method is provided for initiating a handover of a wireless device from a first node to a second node in a communication network. The method includes steps of (a) obtaining, at a first time, a (i) speed, (ii) direction, and (iii) first location of the wireless device, (b) determining, relative to the first location, a first signal strength of the second node and a second, higher signal strength of a third node different from the second node, (c) estimating, based on the obtained (i) first location, (ii) speed, and (iii) direction, a second location for the wireless device at a second, subsequent time, (d) confirming that the second location is within a transmission range of the second node, and (e) preempting the handover to the third node by performing, prior to the second time, the handover directly from the first node to the second node.

20 Claims, 10 Drawing Sheets

SYSTEMS AND METHODS FOR ENHANCED CELLULAR NETWORK HANDOVERS

RELATED APPLICATIONS

This application is a continuation of U.S. patent application Ser. No. 17/525,368, filed Nov. 12, 2021, which prior application claims the benefit of and priority to U.S. Provisional Patent Application Ser. No. 63/112,761, filed Nov. 12, 2020, and to U.S. Provisional Patent Application Ser. No. 63/154,022, filed Feb. 26, 2021. The subject matter of all of these prior applications are incorporated herein by reference in their entireties.

FIELD

This disclosure relates in general to the field of communications and, more particularly, initiation of enhanced device handover techniques for a communication network.

BACKGROUND

Conventional electronic communication user devices, such as a wireless user equipment device (UE), typically communicate through a wireless communication network when the device is operating in communication range of a wireless communication node (e.g., a radio access network (RAN), cellular base station, small cell, evolved node B (eNB), gNB, etc.). When moving outside of the operational range of a first communication node, the UE will handover to a different, second communication node, which may or may not be within the same network as the first communication node. Such internetwork handovers are defined by the 3d Generation Partnership Project (3GPP) Technical Standard for roaming implementations.

FIG. 1 is a schematic illustration depicting a conventional multiple-node communication system 100. In the embodiment depicted in FIG. 1, system 100 includes a mobile device 102 (e.g., a UE) traveling along a physical pathway 104 (e.g., a road) in a direction D. A first communication node 106(1), a second communication node 106(2), and a third communication node 106(3) are respectively disposed at various respective locations proximate pathway 104, and pathway 104 passes through respective portions of a first coverage area 108(1) corresponding to a transmission range of first communication node 106(1), a second coverage area 108(2) corresponding to a transmission range of second communication node 106(2), and a third coverage area 108(3) corresponding to a transmission range of third communication node 106(3). As depicted in FIG. 1, portions of each of the three coverage areas 108(1), 108(2), 108(3) overlaps with one or both of the other coverage areas 108 along respective sections of pathway 104.

In this conventional example, as mobile device 102 travels along pathway 104 in direction D, mobile device 102 comes within range of each of coverage areas 108(1), 108(2), 108(3). Mobile device 102 then connects with nodes 106(1), 106(2), 106(3), respectively, when mobile device 102 is within the particular coverage area 108 corresponding to that node 106. In the case where mobile device 102 is within overlapping coverage areas 108, in conventional system 100, mobile device 102 connects with the particular node 106 exhibiting the greatest relative signal strength. Generally, mobile device 102 will connect with the nearest node 106, i.e., assuming, for ease of illustration, that all three nodes 106 have approximately the same transmit power.

Each of nodes 106(1), 106(2), 106(3) operably connects to at least one network core 110, each of which may be managed by the same network provider, or by separate network providers configured to implement inter-network handovers, such as through a roaming interface (not shown, e.g., an S6/S6a interface). Network core 110 may be a mobile core, or an Evolved Packet Core (EPC), and include one or more of a Serving Gateway (SGW) 112 operably connected to node 106, and to a Packet Data Network Gateway (PGW) 114. PGW 114 in turn connects to a Policy Control and Charging Rules Function (PCRF) unit 116, and to an external electronic network 118, such as the Internet or World Wide Web (WWW). SGW 112 may be further operably connected to a Mobility Management Entity (MME) 120, which may in turn be connected to a Home Subscriber Server (HSS) 122, i.e., in the case of a home network.

Systems and methods for advanced inter-network handovers are described in greater detail in co-pending U.S. Application Ser. No. 17/239,441, filed Apr. 23, 2021, the entirety of disclosure thereof incorporated by reference herein. In system 100, handover between nodes 106 is governed according to 3GPP Technical Specification (TS) 05.10 and 3GPP TS 45.010, which include a Timing Advance (TA) functionality as a media access control (MAC) control element used to control the transmit time of the uplink signal from mobile device 102 to nodes 106. According to 3GPP TS 05.10 and TS 45.010, the TA value is between 0 and 63, where each value represents an incremental step of one bit period (i.e., approximately 3.69 microseconds (µs)). Because radio waves travel at 300,000,000 meters (m) per second (300 m/µs), each single incremental TA step represents a 1,100 meter change in round-trip distance (i.e., twice the propagation range from an individual node 106 to mobile device 102).

Thus, the case where node 106 is a long term evolution (LTE) eNB or LTE macro cell, the TA value will change for each 550 meters change in the coverage range of the LTE eNB/macro cell. Accordingly a maximum distance of macro cell coverage limited to the maximum TA value 63 time 550 meters, or 35 km. In operation of this example, to align subframe timing, eNB node 106 measures the time difference between Physical Uplink Shared Channel (PUSCH)/Physical Uplink Control Channel (PUCCH)/Sounding Reference Signal (SRS) reception and the subframe time, and then sends a TA command to mobile device 102 (i.e., a UE) to change the PUSCH/PUCCH transmission. However, according to this conventional scheme, timing considerations of the uplink signals give rise to a number of handover challenges.

For example, in the case where the PUSCH/PUCCH/SRS signals from UE 102 arrive at eNB 106 too early, the particular LTE eNB 106 will send a TA command to UE 102 asking UE 102 to delay its uplink transmission. On the other hand, if the PUSCH/PUCCH/SRS signals from UE 102 arrive too late at LTE eNB 106, eNB will send a TA command to UE 102 asking UE 102 to advance its uplink transmission. According to the conventional techniques, handover from one eNB 106 to another is based on statically defined thresholds for these timing considerations.

When UE 102 is in idle mode, the device mobility is dependent on idle mode parameters and a 3GPP-defined periodic timer. The minimum time periods of this period timer are considered quite large, and few conventional user devices will stay in idle mode for such durations. When UE 102 is in connected mode though, UE 102 typically only initiates handovers when the signal strength from a connected eNB 106 drops below a predetermined threshold, upon which UE will then move to a different eNB 106 demonstrating the highest signal strength. However, when UE 102 is moving, due to the timing considerations described above, the signal strength from a new eNB 106 may no longer be the relatively highest by the time the handover is completed.

More particularly, referring to the example depicted in FIG. 1, at a first time t0, mobile device 102 is connected to first node 106(1). At a second time $t_1$, mobile device 102 has moved outside of first coverage area 108(1) corresponding to first node 106(1), and is now within overlapping portions of second coverage area 108(2) with third coverage area 108(3). According to conventional techniques, since mobile device 102 is nearest to second node 106(2) at second time $t_1$, mobile device 102 will hand over from first node 106(1) to second node 106(2). However, depending on the speed of mobile device 102, this first handover may not be completed until a third time $t_2$, at which time mobile device 102 has already moved outside of second coverage area 108(2), and now entirely within third coverage area 108(3). Accordingly, mobile device 102 will then have to complete a second handover from second node 106(2) to third node 106(2). That is, conventional system 100 does not contain sufficient intelligence to select the optimum node 106 to minimize the total number of handovers, and instead performs handovers based only on the signal strength, such as the RSRP and/or RSRQ.

Because each handover can affect the quality of service (QOS) of the device transmission, there is a desire in the industry to reduce the number of handovers of a moving device over the entirety of the length of travel. Furthermore, there is an additional desire in the industry to reduce the overall number of system handovers, because each individual handover operation will increase the traffic to and from both nodes handling the exchange, thereby affecting the overall performance of system 100.

SUMMARY

A method is provided for initiating a handover of a wireless electronic user device from a first communication node of a wireless communication network to a second communication node of the wireless communication network. The method includes a step of obtaining, at first timing step, a speed of movement, a direction of travel, and a first location for the wireless electronic user device. The method further includes a step of determining, relative to the first location, a first signal strength of the second communication node and a second signal strength of a third communication node different from the second communication node. The second signal strength is greater than the first signal strength. The method further includes a step of estimating, based on the obtained first location, the speed of movement, and the direction of travel, a second location for the wireless electronic user device at a second timing step subsequent to the first timing step. The method further includes steps of confirming that the second location is within a transmission range of the second communication node, and preempting the handover to the third communication node by performing, prior to the second timing step, the handover of the wireless electronic user device directly from the first communication node to the second communication node.

BRIEF DESCRIPTION

These and other features, aspects, and advantages of the present disclosure will become better understood when the following detailed description is read with reference to the accompanying drawings in which like characters represent like parts throughout the drawings, wherein.

Figure 11A:
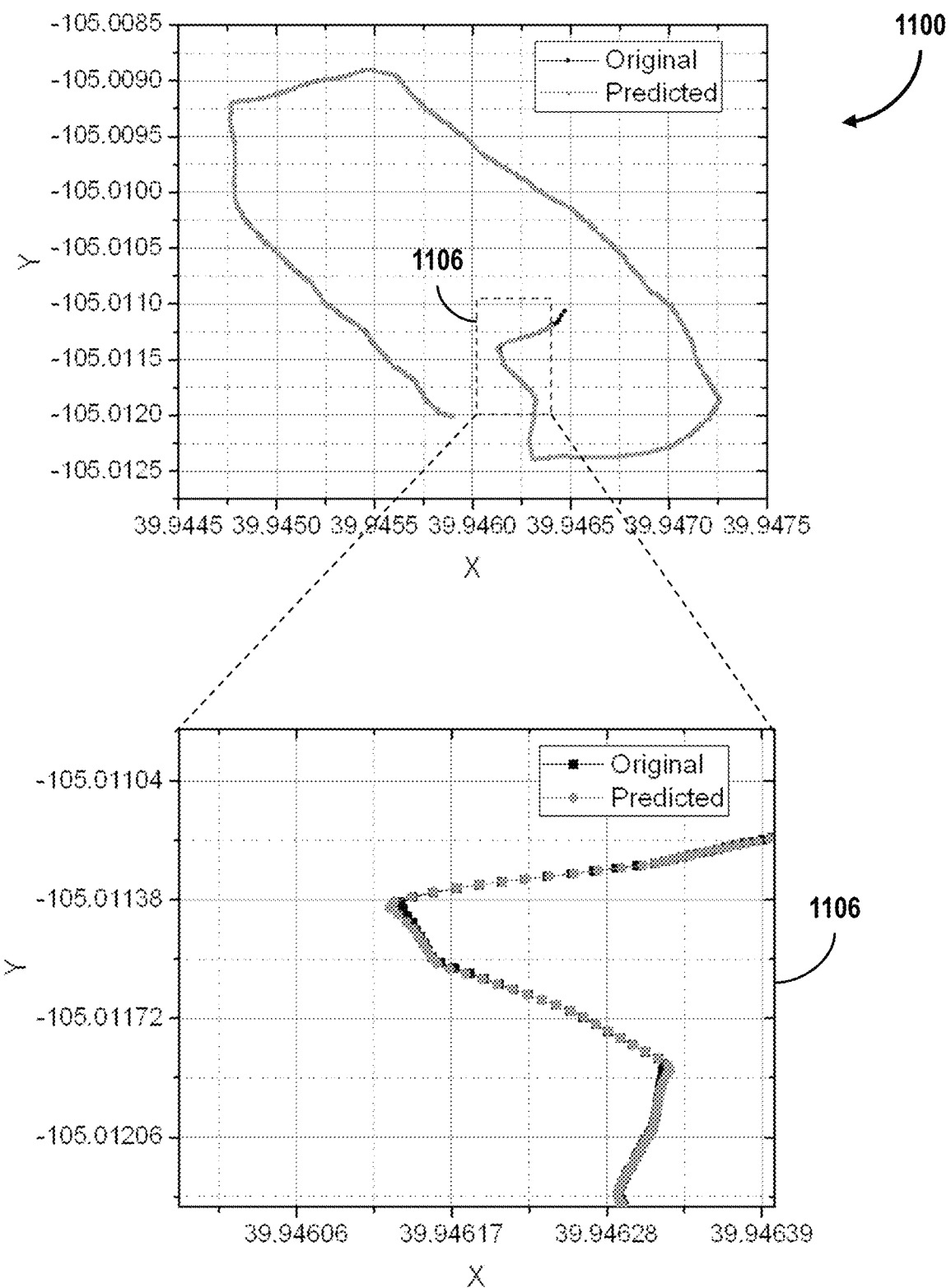
Figure 11B:
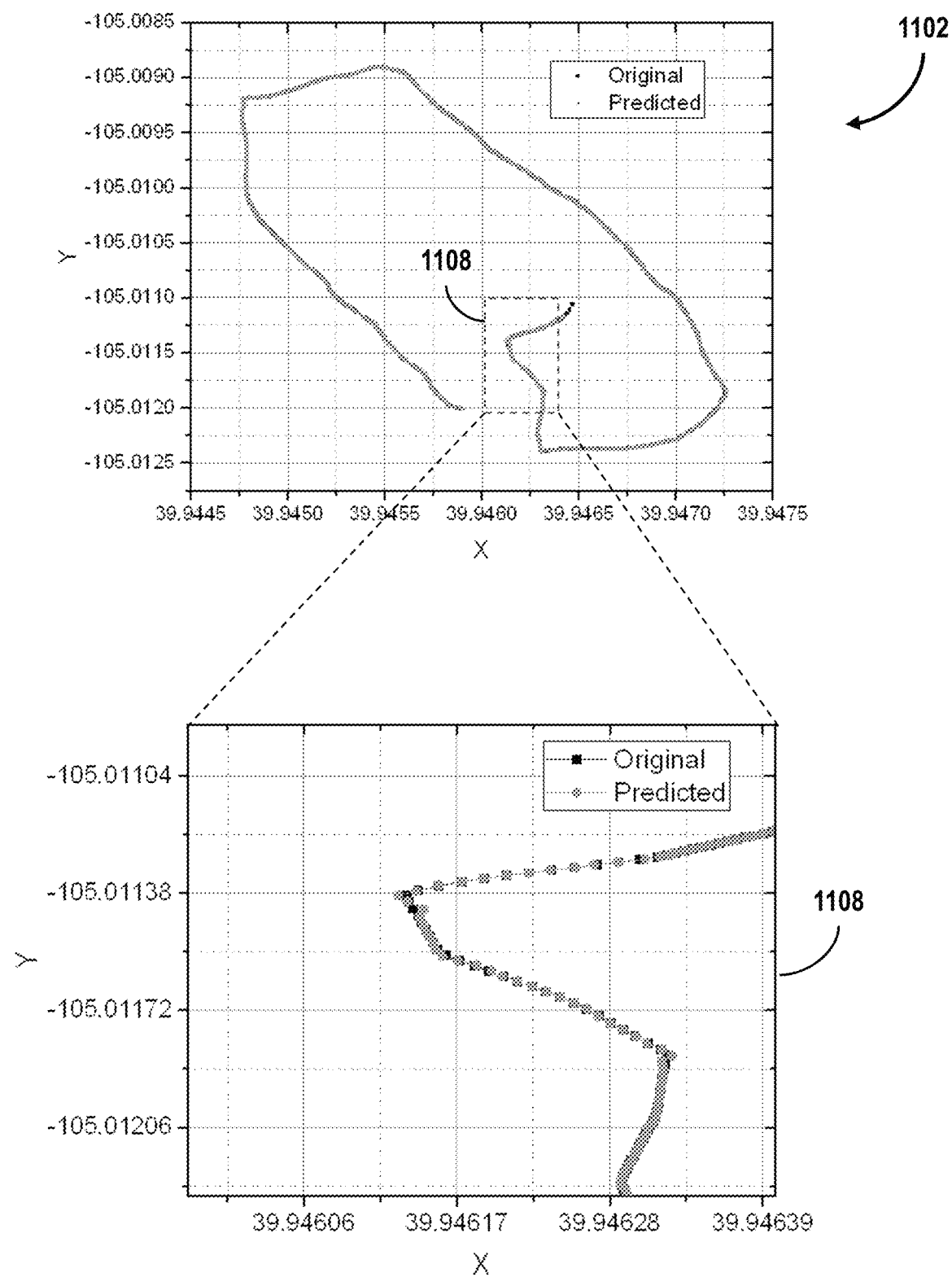
Figure 11C:
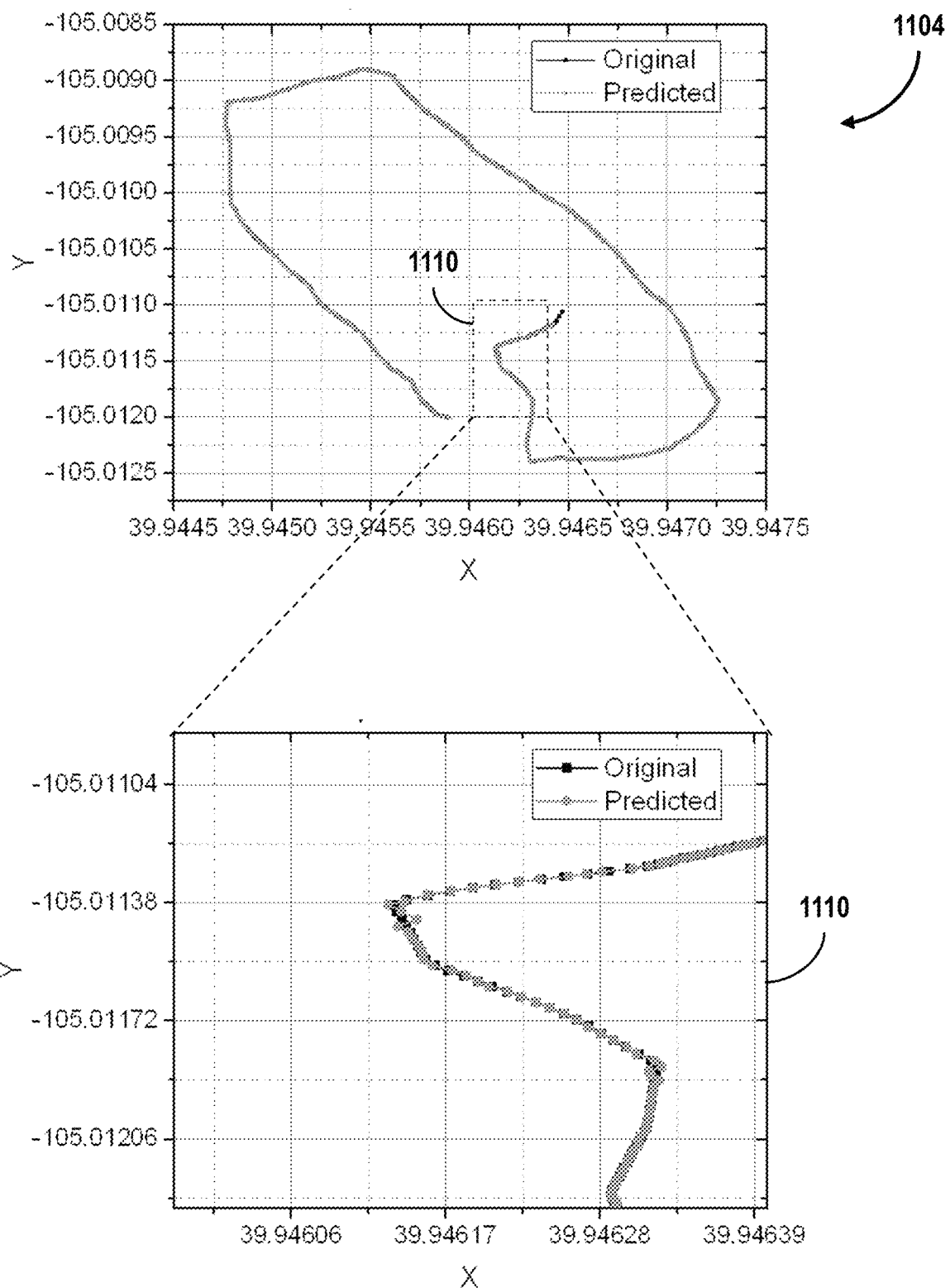

FIGS. 11A-C are graphical illustrations depicting respective mobility prediction emulation results.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As described herein, "user equipment," or UE, refers to an electronic device or system utilizing a wireless technology protocol, such as Long Term Evolution (LTE) or WiMAX (e.g., IEEE 802.16 protocols), and may include therein Wi-Fi capability to access and implement one or more existing IEEE 802.11 protocols. A UE may be fixed, mobile, or portable, and may include a transceiver or transmitter-and-receiver combination. A UE may have separate components, or may be integrated as a single device that includes a media access control (MAC) and physical layer (PHY) interface, both of which may be 802.11-conformant and/or 802.16-conformant to a wireless medium (WM).

According to the innovative systems and methods described herein, a communication network is advantageously enabled to intelligently select an appropriate target node/eNB for a mobile device utilizing several measurable parameters, including without limitation, (i) exact geolocations of nodes deployed throughout the network, (ii) the variable location of the mobile device at different timings, (iii) the speed and direction of the moving mobile device, (iv) additional knowledge of physical topology of travel pathways throughout the network, (v) physical traffic conditions impeding movement of the mobile device, and (vi) data traffic affecting the various communication nodes deployed throughout the network.

According to the exemplary embodiments described further below, the network is further enabled to dynamically perform enhanced device handovers to reduce handovers that unnecessarily increase data traffic. In an exemplary embodiment, the present systems and methods represent significant improvements over conventional techniques, by further enabling on-the-fly changes to handover thresholds based on the real-time state of the mobile device/UE and/or the node/RRC.

Enhanced Roaming Handovers

Figure 1:
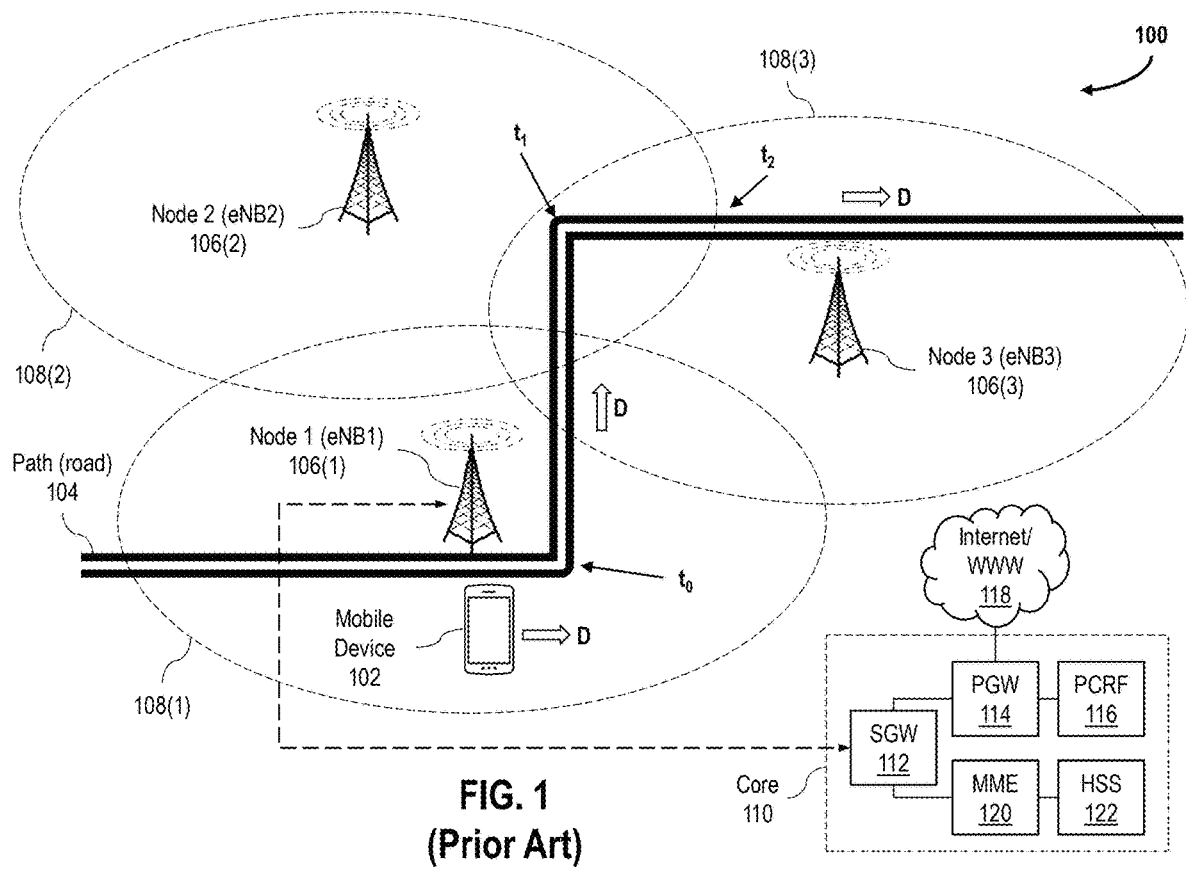
FIG. 1 is a schematic illustration depicting a conventional multiple-node communication system.
Figure 2:
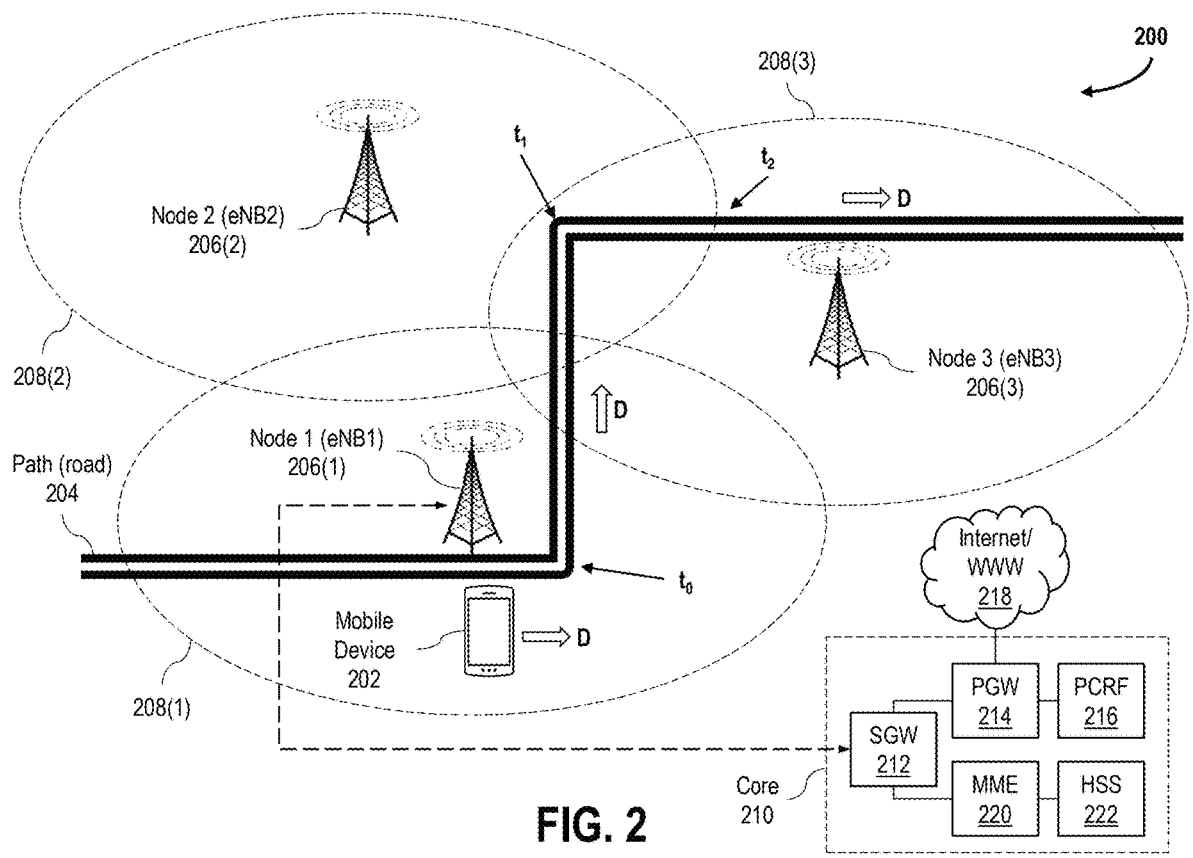
FIG. 2 is a schematic illustration depicting an exemplary multiple-node communication system, in accordance with an embodiment.

FIG. 2 is a schematic illustration depicting an exemplary multiple-node communication system 200. System 200 is architecturally similar to conventional system 100, FIG. 1, and thus similarly includes a mobile device 202 (a UE, in this example) traveling along a physical pathway 204 (a road, in this example) in a direction D, a first communication node 206(1), a second communication node 206(2), a third communication node 206(3), a first coverage area 208(1) corresponding to first communication node 206(1), a second coverage area 208(2) corresponding to second communication node 206(2), and a third coverage area 208(3) corresponding to third communication node 206(3). Except for the novel operational principles of system 200, described further herein, individual elements of system 200 will generally have at least the same functionality of respective elements of system 100 having the same labels.

Also similar to system 100, in system 200, each of nodes 206(1), 206(2), 206(3) may operably connect to at least one network core 210 (e.g., managed by the same or different network providers), which may also be configured to implement intra- or inter-network handovers through a roaming interface (not shown), such as an S6/S6a interface. Network core 210 further may similarly include one or more of an SGW 212 operably connected to a PGW 214, which in turn may further connect to a PCRF unit 216, and to an external electronic network 218 (e.g., Internet and/or WWW). SGW 212 may further operably connect to an MME 220, which in turn may connect to an optional HSS 222.

Different though, from system 100, in an exemplary embodiment, system 200 enables enhanced handover capability of mobile device 202 between respective nodes 206. That is, in addition to consideration of the relative signals strengths (e.g., RSRP, RSRQ, etc.) of the nodes 206 with respect to mobile device 202, system 200 is advantageously enabled to additionally determine and consider the geolocations of both the serving nodes/cells 206, and also that of mobile device 202 at one or more discrete moments in time (e.g., using a GPS device). System 200 is further enabled to consider this geo-location data together with speed and direction of travel of mobile device 202 through the topology of system 200, e.g., along pathway 204, along with real-time data of dynamic conditions of the topology (e.g., vehicle traffic on a road), to accurately predict when and where mobile device 202 is approaching or leaving the respective cell edges of coverage areas 208(1), 208(2), and 208(3).

With such accurate positioning and timing information, system 200 is thus able to accurately predict the location of mobile device 202 at not only a present time, but also at a future time, using the speed, direction, and geo-location data. In some embodiments, the speed and direction data may be obtained through a comparison of the geo-locational position of mobile device 202 at two different discrete moments in time (e.g., first time $t_0$ and second time $t_1$). In other embodiments, speed and direction data may be obtained directly from mobile device 202 (e.g., through applications on a UE smartphone, using compass and speedometer information from an intelligent connected motor vehicle, etc.). In such cases, system 200 may still be further enabled to dynamically update such received information to adjust the predicted device positioning in real-time for handover optimization, since timing, as discussed above, is a standardized parameter in the cellular paradigm.

In an illustrative example of the embodiment depicted in FIG. 2, pathway 204 may represent a high-speed roadway, and mobile device 202 may represent either a connected motor vehicle or a UE contained therein (e.g., a smartphone in an automobile). In this example, system 200 may determine that mobile device 202 is traveling at 65 mph along roadway 204 in direction D, and that roadway 204 contains no significant vehicular traffic or other conditions (e.g., construction, weather) to impede the movement of mobile device. In this case, system 200 may advantageously determine, as mobile device moves from a first position along roadway 204 (i.e., entirely within coverage area 208(1), in this example) at first time $t_0$, to a second position along roadway 204 at second time $t_1$, namely, within overlapping portions of second coverage area 208(2) and third coverage area 208(3), that a single handover directly from first node 206(1) to third node 206(3) is optimal, instead of performing a first handover to second node 206(3) and then a second handover to third node 206(3).

More particularly, at second time $t_1$, system 200 may determine that, despite the fact that the signal strength from second node 206(2) may be higher than that from third node 206(3), the speed and direction of mobile device 202 may indicate that, by the time a handover is completed (e.g., at time $t_2$), mobile device may (i) already be outside of second coverage area 208(2), (ii) be nearer to third node 206(3) than to second node 206(2), or (iii) experience less overall QoS loss by moving to the cell edge of third node 206(3) than from performing a double handover to intermediary second node 206(2). According to this functionality, system 200 is advantageously enabled to realize significantly improved traffic efficiency in the overall network, as well as increased QoS for individual mobile devices as they physically move across the network.

The present systems and methods represent still further improvements over conventional techniques in that, whereas the conventional system is reactive—i.e., handovers are performed in real-time based on signal strength reductions, the present embodiments are predictive. That is, the present embodiments enable the preemption of unnecessary future handovers. Accordingly, through a modest increase in processing resources (described further below), the present systems and methods enable a significant reduction in mobile device handovers, and thus the commensurate signal losses and data traffic increases arising therefrom.

In at least one embodiment, the speed of mobile device 102 may be accurately determined by comparing the difference in geo-location of mobile device 202 between first time $t_0$ and second time $t_1$, and with respect to the rate of change of the TA value, described above. In some instances, the location of mobile device 202 may be dynamically measured or updated by comparing the signal strengths, as measured by mobile device 202 (e.g., a UE), between the serving and neighboring cells having known, precise geo-locations.

As described above, in the case where mobile device 202 is an LTE device, such LTE devices may be in either an idle state or a connected state, sometimes referred to as "RRC-Idle" and "RRC-Connected," respectively. In the RRC-Idle state, the radio unit of the UE is inactive, but may nevertheless have an IP address assigned and tracked by the network. In such cases, the UE itself may be known to the network core/EPC, but may not be known to the LTE eNB. Thus, in the idle state or mode, mobility is controlled by UE, and the UE performs PLMN selection, cell selection and re-selection, tracking area registration, broadcast message reception, paging channel monitoring, and related functions.

In contrast, in the RRC-Connected state, the radio is active, and the UE is known to both the EPC and the LTE eNB. In the connected mode/state, mobility is instead controlled by the network, but the UE may still perform neighboring cell measurement, maintain eNB context, monitor the control signaling channel, and report CQI and feedback information to the eNB. While in the connected mode, both the network (e.g., core 210) and UE (e.g., mobile device 202) are able to transmit and receive user plane data, etc.

Accordingly, in an exemplary operation of system 200, because a UE mobile device 202 may be active or inactive in the RRC-Connected state, network core 210 may be further configured to dynamically obtain the geo-location of mobile device 202. This device information may then be analyzed together with cell site geo-location data of the plurality of nodes 206, as well as geolocation information regarding the topology surrounding mobile device 202 and nodes 206 (e.g., roads, exits, highways, construction zones, etc.). This geo-location data may then be overlaid with data regarding loading and data traffic on both the serving (e.g., first node 206(1)) and neighboring (e.g., second and third nodes 206(2), 206(3), respectively) eNBs/small cells/macro cells, and then analyzed with respect to the speed at which the device is moving. Using the determinations from such analysis, network core 210 is enabled to dynamically adjust or change the handover threshold for each device 202.

Applying these innovative techniques to the exemplary embodiment depicted in FIG. 2, it can be seen that system 200 advantageously preempts a handover to second node 206(2) (i.e., at second time $t_1$), and instead perform a direct handover of mobile device 202 from first node 206(1) to third node 206(3). The person of ordinary skill in the art will understand that, for ease of explanation and not in a limiting sense, this exemplary scenario is limited to a single mobile device and three nodes. In practice, system 200 may include many more nodes, and a significantly higher number of mobile devices. Thus, this advantageous handover reduction therefore increases with the number of devices and nodes deployed in a networked system.

In some embodiments, network core 210 may be still further configured to cause an early, preemptive handover of mobile device 202 while mobile device 202 is in the RRC-Connected state, but inactive. By this preemptive action, the network is further enabled to advantageously avoid performance of handovers when a UE is active in the RRC-Connected state, thereby further significantly reducing traffic among multiple active UEs within system 200. That is, the network may preemptively schedule handovers of inactive devices to predictively avoid congestion with active devices in the directional movement path of the inactive device.

Figure 3:
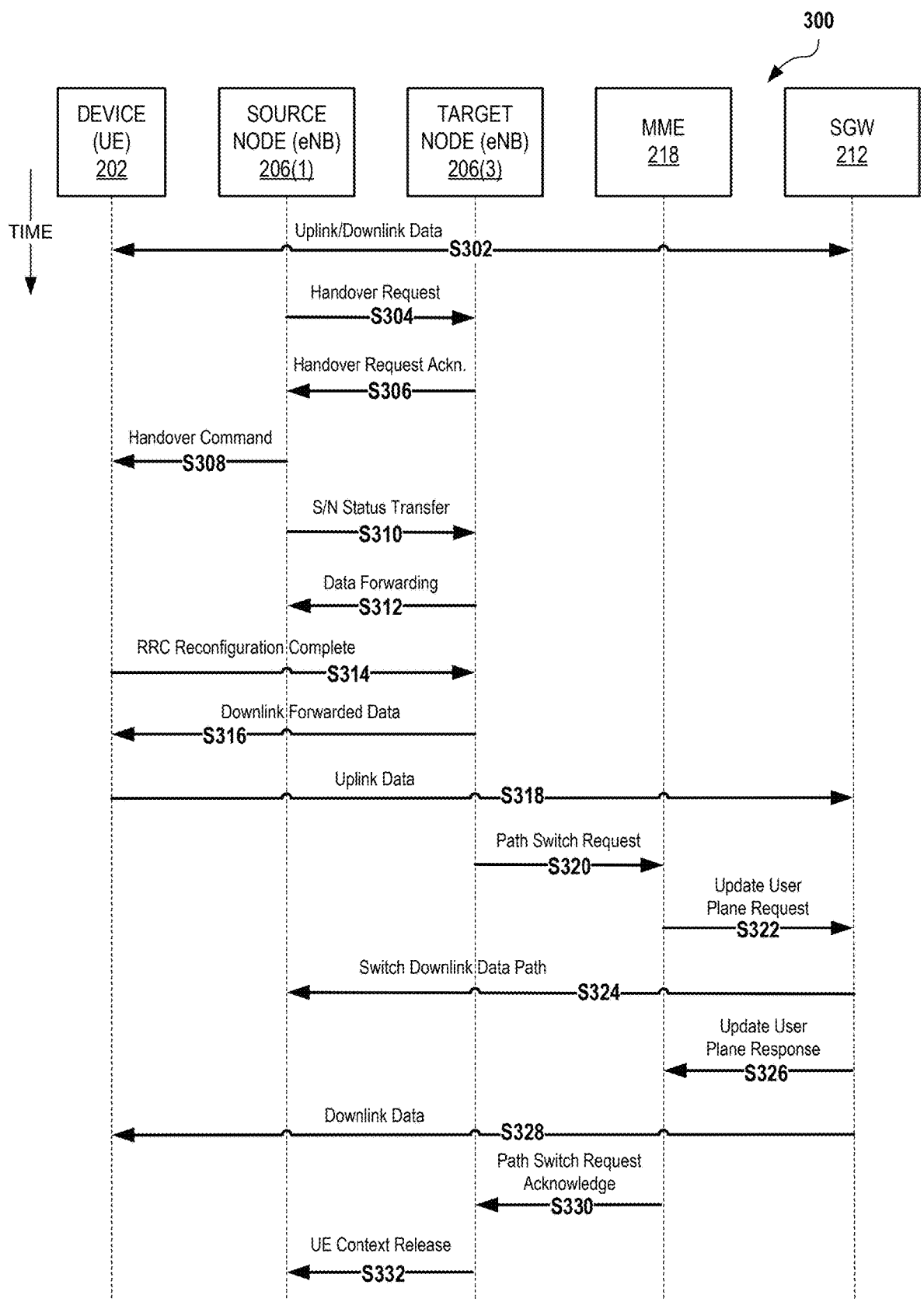
FIG. 3 is a sequence diagram depicting an exemplary handover process, in accordance with an embodiment.

FIG. 3 is a sequence diagram depicting an exemplary handover process 300. Process 300 may be implemented, for example, with respect to system 200, FIG. 2, and a UE (e.g., mobile device 202) roaming from a source node (e.g., first node 206(1)) to a target node (e.g., third node 206(3)). In the embodiment depicted in FIG. 3, process 300 is further described with respect to interaction with, and implementation of, MME 218 and SGW 212 of core network 210 for facilitating the source-to-target node handover. Unless otherwise described to the contrary, some or all of the following steps of process 300 may be performed simultaneously, or in a different order. In some embodiments, more or fewer steps may be performed without departing from the scope herein.

In operation, process 300 begins at step S302, in which device 202 exchanges uplink and downlink data with SGW 212, namely, through an existing active connection with source node 206(1). In step S304, source node 206(1) submits a handover request to target node 206(3). In step S306, target node 206(3) sends a handover request acknowledgement to source node 206(1). In step S308, source node 206(1) sends a handover command to device 202.

In step S310, source node 206(1) provides a status transfer notification to target node 206(3) and, in step S312, target node 206(3) forwards relevant data back to source node 206(1). In step S314, mobile device 202 notifies target node 206(3) that RRC configuration is complete and, in step S316, target node 206(3) forwards relevant downlink data to mobile device 202. In step S318, mobile device again transmits uplink data to SGW 212.

In step S320, target node 206(3) sends a path switch request to MME 218. In step S322, MME 218 sends SGW 212 an update user plane request. In step S324, SGW 212 communicates with source node 206(1) to switch the downlink data path and, in step S326, SGW 212 sends MME 218 an update user plane response. In step S328, SGW 212 again transmits downlink data to mobile device 202, i.e., via target node 206(3). In step S330, MME sends an acknowledgement to the path switch request received in step S320. In step S332, target node 206(3) provides a UE context release to source node 206(1).

As indicated by the sequence flows of process 300, much of the handover processing between a source node and a target node may be performed similarly to conventional handover techniques. As described above though, the present systems and methods advantageously utilize dynamic measurements and data to predictively select the optimal target node. The present embodiments further advantageously enable a communication network to dynamically adjust the predictive target node selection as real-time conditions change, and/or according to whether the mobile device is in an active or inactive state.

Mobility Prediction for Positional Awareness

In recent years, rapid growth of the Internet of Things (IoT), mobile computing, virtual-reality (VR)/augmented-reality (AR) entertainment, and self-driving automobiles, among other things, has dramatically increased the demand for higher data communication rates, and with better customer experience. This demand is continually driving both present and future mobile data communication networks (e.g., 3GPP, 4G, 5G, 5G New Radio (5GNR), 6G) to become faster and more intelligent.

As described above, positional awareness functionality provides innovative intelligence solutions to improve communication speed throughout a network. Other recent proposals in the industry suggest beamforming for the recently released millimeter-wave (MMW) bands among and greater than 24, 28, 39, and 60 GHz, due to the concentration of energy distribution therein, as well as the increased number of antenna elements required for more precise positioning information to target user devices, QoS optimization, and geometry-dependent beam tracing. Additionally, during operation, conventional beamforming systems also require more accurate feedback of user mobility information to the network to facilitating more seamless cell handovers, efficient resource management, and additional positional awareness services. Within the indoor environment paradigm, conventional beamforming techniques often outperform commercial global navigation satellite systems (GNSS), while additionally providing higher resolution and availability.

The following embodiments provide additional mobility prediction solutions, including novel beamforming techniques, for outdoor application scenarios utilizing intelligent radio access networks (RANs). These innovative mobility prediction implementations are thus of particular usefulness for future RANs, which will benefit from improved acquisition, exploitation, and prediction of UE location information for a number of burgeoning technologies, including without limitation, radio resource management, self-driving automobiles, and intelligent traffic systems (ITS).

The following systems and methods further introduce unique positional awareness solutions, including without limitation: (i) mobility prediction assisted beamforming; (ii) cell handovers and consecutive connections; (iii) wireless assisted traffic management; and (iv) transmission redundancy reduction. These solutions may be advantageously implemented in a complementary fashion with some or all of the above-described embodiments, some or all of the following other application scenarios, or alternatively as standalone solutions.

In an exemplary embodiment the present solutions may further implement one or more innovative algorithms or processing techniques for predicting user mobility trends based on historical samples of user device position, including without limitation, least mean-square (LMS) adaptive filtering, cubic spline interpolation, and polynomial nonlinear regression.

Mobility and Blockage Predictions for Beamforming

Figure 4:
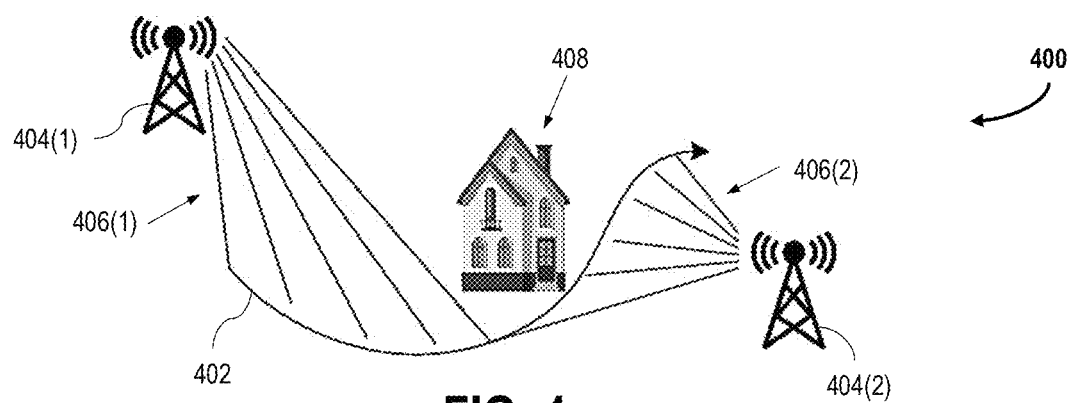
FIG. 4 is a schematic illustration depicting a mobility prediction system for a millimeter wave positioning application scenario, in accordance with an embodiment.

FIG. 4 is a schematic illustration depicting a mobility prediction system 400 for an MMW positioning application scenario. In an exemplary embodiment, system 400 implements MMW beam sweeping for enhanced mobility prediction of a mobile device pathway 402 from the vicinity of a first communication node 404(1) to a second communication node 404(2). In this example, first and second communication nodes 404(1), 404(2) may include a base station, and/or be similar to communication nodes 206, FIG. 2. In an exemplary embodiment, antenna elements (not separately shown) of first communication node 404(1) are configured sweep first high-frequency MMW beam patterns 406(1) toward mobile device pathway 402, and similar antenna elements of second communication node 404(2) are also configured sweep second high-frequency MMW beam patterns 406(2) toward mobile device pathway 402.

In exemplary operation of system 400, implementation of beamforming for the high-frequency MMW wireless communications from first and second communication nodes 404(1), 404(2) significantly extends the transmission distance of first and second beam patterns 406(1), 406(2) to compensate for the increased path loss of the high-frequency MMW signals. Accordingly, the respective base stations of first and second communication nodes 404(1), 404(2) are each enabled to adjust the phases of their antenna elements to proactively sweep first and second beam patterns 406(1), 406(2), respectively, to the next target position. Such proactive sweeping techniques provide system 400 with position and direction information of mobile device pathway 402, thereby enabling system 400 with enhanced and intelligent mobility prediction functionality which, in comparison with conventional techniques, significantly improves reliability, consecutiveness, QoS, and customer experience.

In further or alternative exemplary operation of system 400, the network (not shown in FIG. 4) of first and second communication nodes 404(1), 404(2) is additionally enabled to consider the topology and environmental conditions related to mobile device pathway 402 when determining whether a switch, i.e., handover, to a different beamforming station is warranted. Utilizing the enhanced mobility prediction techniques described herein, the network may proactively determine to handover from first communication node 404(1) to second communication node 404(2) as mobile device pathway 402 nears a blockage 408 (a residential structure, in this example). For example, in the case of line-of-sight (LoS) MMW systems, the high-frequency MMW bands are significantly more susceptible to scattering and reflections from blockages 408. The predictive mobility solutions herein though, significantly improve the QoS for such line-of-sight MMW systems by proactively performing handovers prior to encountering the expected signal impediments.

Cell Handover and Mobile Resource Management

As illustrated above, the advantages achieved according to the present enhanced mobility prediction techniques are not limited to networks implementing LOS channel conditions; the present embodiments also provide significant to non-LoS systems, and particularly such non-LoS systems utilizing omni-directional antennas. In conventional LTE systems, although soft handovers between macro cells (i.e., a mobile device need not be disconnected from the first cell before connecting to the second cell) are possible, such conventional LTE systems require a number of coordination mechanisms to guarantee that there is an overlap region where both cells are able to serve the connected device simultaneously. However, at present, the industry is trending to both significantly reduced the cell size, while also developing heterogeneous networks where macro cells coexist with small cells.

Given such trends, handover processes are expected to occur much more frequently and abruptly, thereby requiring significantly more complex coordination mechanisms to maintain consecutive connections. As described further below with respect to FIG. 5, the present systems and methods greatly mitigate this challenge arising in developing cellular networks.

Figure 5:
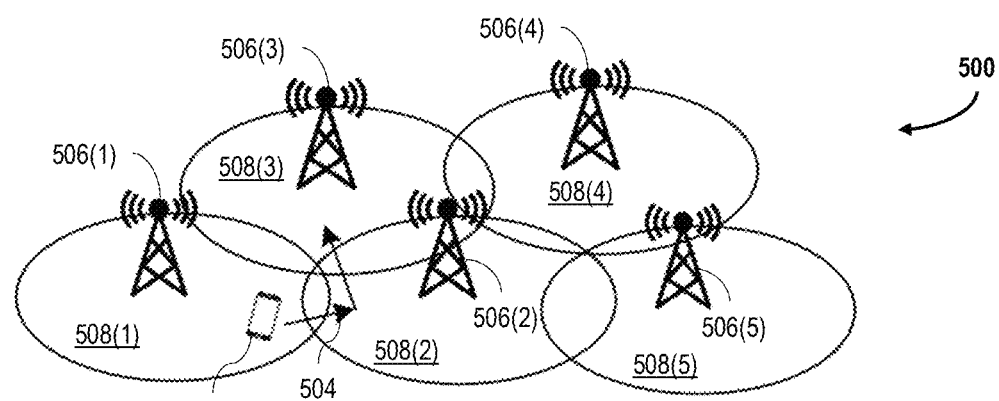
FIG. 5 is a schematic illustration depicting a mobility prediction system for a cellular handover application scenario, in accordance with an embodiment.

FIG. 5 is a schematic illustration depicting a mobility prediction system 500 for a cellular handover application scenario. In the exemplary embodiment depicted in FIG. 5, system 500 is similar, in many aspects, to system 200, FIG. 2, and includes a mobile device 502 traveling along a device pathway 504 among a plurality of communication nodes 506. In this example, each of communication nodes 506 has a respective coverage area 508 partially overlapping with at least one neighboring coverage area 508. Utilizing the predictive mobility techniques described above with respect to FIGS. 2-3, the network (not separately shown) of system 500 is advantageously enabled to proactively redistribute node resources in advance of device pathway entering respective coverage areas 508, thereby significantly improving the QoS in the case of increasingly frequent and abrupt cell handovers.

Wireless Assisted Traffic Management

Self-driving automobiles are expected to greatly impact present and future traffic management systems, and particularly in light of the parallel development of 5G, 5GNR, and wireless IoT technologies being used to assist the self-driving automobiles, in light of the fact that present 5G networks are considered to provide more accurate positioning capability than existing GNSS services.

Figure 6:
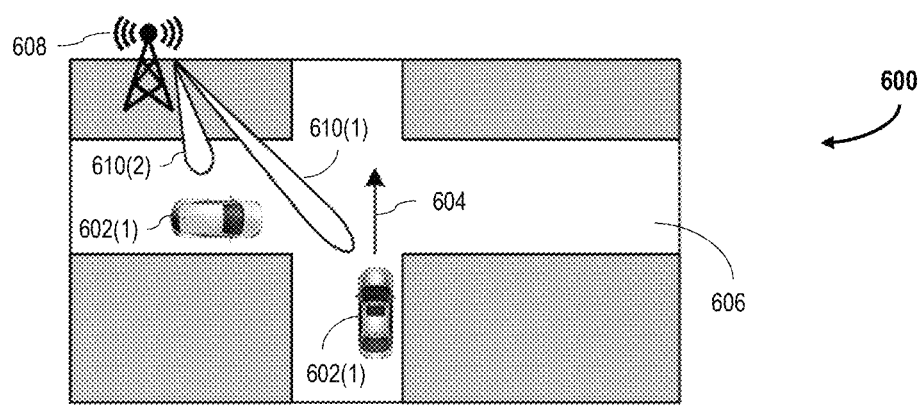
FIG. 6 is a schematic illustration depicting a mobility prediction system for a traffic management application scenario, in accordance with an embodiment.

FIG. 6 is a schematic illustration depicting a mobility prediction system 600 for a traffic management application scenario. In the exemplary embodiment depicted in FIG. 6, system 600 includes a first connective-capable automobile 602(1) and a second connective-capable automobile 602(2). In this example, first automobile 602(1) is depicted to be traveling along a mobile pathway 604 crossing in front of second automobile 602(2) on a road 606. In an exemplary embodiment, system 600 is representative of a 5G network, and includes at least one 5G node 508 within the 5G network infrastructure, which is configured to operatively communicate a first transmission 610(1) with first automobile 602(1), and a second transmission 610(2) with second automobile 602(2).

Through the exemplary vehicle-to-infrastructure (V2I) communication architecture depicted in FIG. 6, position information may be readily collected through the 5G network, and then easily shared among the a plurality of automobiles 602, as well as to and from local traffic management systems (not shown). With such position information, system 600 is advantageously enabled to analyzing the relevant data similarly to the techniques described above, and then intelligently predict vehicle mobility, as well vehicle traffic trends in the area system 600. An intelligent RAN according to system 600 may thus effectively assist in collision avoidance to enhance the security of self-driving vehicles of all types, while further being of particular use for enhanced traffic monitoring functionality to mitigate traffic congestions.

Network Redundancy and Overhead Reduction

A significant challenge to future mobile network development arises from the increasing amount of overhead and redundancies required to expand such networks, which significantly reduce the spectral efficiency and effective achievable rates thereof. This challenge becomes particularly pronounced in the large-scale digital beamforming system paradigm, in which every antenna element is required to frequently perform channel estimation during communications between base stations and mobile devices. As described further below with respect to FIG. 7, the present enhanced mobility prediction techniques may be further implemented to significantly mitigate this particular challenge.

Figure 7:
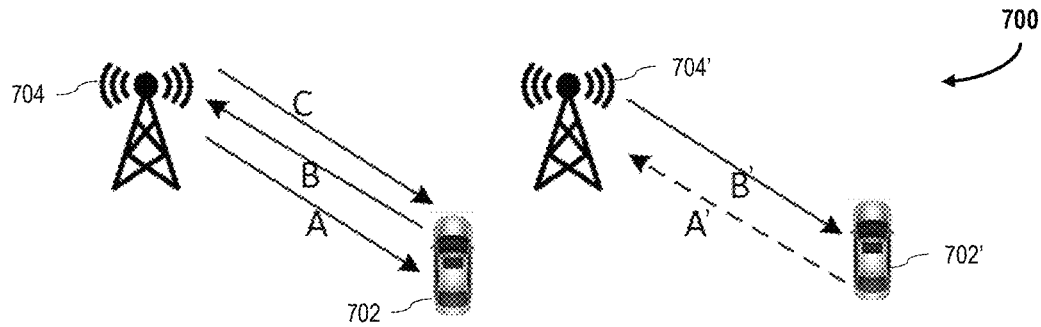
FIG. 7 is a schematic illustration depicting a mobility prediction system implementing network redundancy reduction, in accordance with an embodiment.

FIG. 7 is a schematic illustration depicting a mobility prediction system 700 implementing network redundancy reduction. For ease of explanation, system 700 is described with respect to a single connective-capable vehicle 702 in communication with a base station 704. The person of ordinary skill in the art will understand that the principles described herein are not limited to single bidirectional V2I communications, but may be more generally applied to multiple mobile devices connecting to multiple different nodes over time, without departing from the scope herein.

In an exemplary embodiment, base station 704 includes at least one processor in communication with a memory device (not separately shown), where the processor may be configured with one or more of the mobility prediction algorithms described herein, and where the memory is configured to pre-store geometric channel information relevant to the geographic area proximate the particular base station 704. Utilizing such mobility prediction programming and pre-stored geometric channel information at each base station 704, system 700 is advantageously enabled to significantly reduce the training frequency and amount of training overhead to perform mobility prediction for vehicle 702.

Accordingly, the processor of base station 704 is further enabled to actively learn the behavior of vehicle 702 such that an intelligently-informed base station 704' may more accurately predict the behavior of vehicle 702'. Thus, instead of having base station 704 continue to signal (designated as arrow A) vehicle 702 and then wait for a periodic status report (arrow B) before adjusting the signal to vehicle 702 (arrow C), the intelligent learning base station 704' of system 700 may significantly simplify the control channel for frequent bidirectional coordination processing, by avoiding many of the unneeded conventional multi-round-trip report-and-adjust processing steps, as depicted in FIG. 7. According to this enhanced predictive mobility technique, processing delays may be greatly mitigated by enabling base station 704' to proactively send the adjustment signals (arrow B') to vehicle 702'. In this intelligent configuration, base station 704' may then dynamically modify the adjustment signal in the case where vehicle 702' sends new information to base station 704' relevant to the predictive model.

Mobility Prediction Schemes

Figure 8:
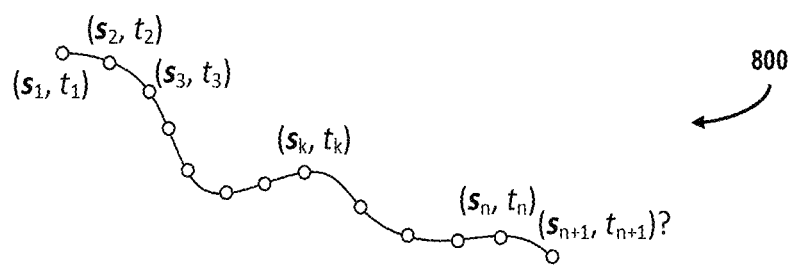
FIG. 8 depicts an exemplary mobility prediction model, in accordance with an embodiment.

FIG. 8 depicts an exemplary mobility prediction model 800. Mobility prediction model 800 may, for example, be implemented with respect to one or more of the mobility prediction embodiments described herein. In the exemplary embodiment depicted in FIG. 8, mobility prediction model 800 represents a mobile user device movement trajectory as a series of discrete location samples, where each location sample includes timed X-Y coordinate information such that $S_i=(x_i,y_i)$ for a sampling time $t_i$. According to these designations, mobility prediction model 800 may thus further represent the discrete moving history of a user device as $[S_1, S_2, \ldots, S_N]$, and for the time series of $[t_1,t_2, \ldots ,t_N]$, to enable a predictive estimate for a next possible device position $S_{N+1}$ at a future known time $t_{N+1}$, using one or more of the following predictive algorithm techniques.

LMS Adaptive Filtering

In an exemplary embodiment, mobility prediction model 800 utilizes an LMS adaptive filtering technique to estimate the next device position $S_{N+1}$. According to this algorithmic technique, using the last collected position sample $S_N$ at time $t_N$, the velocity $v_N$ of the device at position $S_N$ may be estimated according to:

$$v_N = \frac{s_N - s_{N-1}}{t_N - t_{N-1}} \quad \text{(Eq. 1)}$$

From Eq. 1, the first order of acceleration $a_N$ at position $S_N$ may be determined according to:

$$a_N = \frac{v_N - v_{N-1}}{t_N - t_{N-1}} = \frac{1}{t_N - t_{N-1}}\left(\frac{s_N - s_{N-1}}{t_N - t_{N-1}} - \frac{s_{N-1} - s_{N-2}}{t_{N-1} - t_{N-2}}\right) \quad \text{(Eq. 2)}$$

From Eqs. 1 and 2, the next device position $S_{N+1}$ may be estimated using the following Tylor series:

$$s_{N+1} = s_N + v_N(t_{N+1} - t_N) + \frac{1}{2}a_N(t_{N+1} - t_N)^2 + \cdots \quad \text{(Eq. 3)}$$

Eq. 3 may be also be represented as:

$$s_{N+1} = \sum_{i=1}^{L} c_i s_{N-i+1}. \quad \text{(Eq. 4)}$$

From Eq. 4, the estimated the next device position $S_{N+1}$ may be calculated as a linear combination of previous historical position samples, which samples may then be input into an LMS adaptive filter as described further below with respect to FIG. 9.

Figure 9:
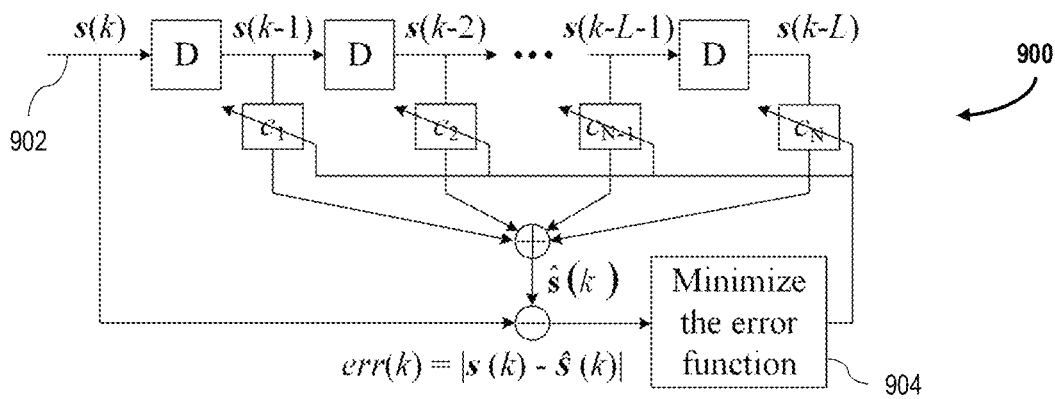
FIG. 9 is a schematic illustration depicting an exemplary least mean squared adaptive filter, in accordance with an embodiment.

FIG. 9 is a schematic illustration depicting an exemplary LMS adaptive filter 900. In an exemplary embodiment, LMS adaptive filter 900 is configured to estimate the combination coefficients to minimize the mean square error (MSE) from the historical series of discrete location samples from mobility prediction model 800, FIG. 8. In exemplary operation of LMS adaptive filter 900, are provided to a filter input 902. Filter input is then fed to a plurality (i.e., 1-N) delays D, followed by a respective plurality of 1-N coefficients c, which are then collectively summed, and then subtracted from filter input 902 before being fed to an error minimization unit 904, the output of which is then fed back to each of the coefficients c. In the example depicted in FIG. 9, LMS adaptive filter 900 is configured to process a number L of historical position samples to determine the next device position $S_{N+1}$. In some embodiments, LMS adaptive filter 900 may be further configured with some initial training processing.

Cubic Spline Interpolation

The LMS adaptive filter techniques may be particularly useful in the case where the next device position $S_{N+1}$ may be based on a simplified assumption that the predicted next position may be represented determined from a linear combination of previous user movement history samples. In some cases though, such linearity assumptions may not be considered sufficient for the prediction of more complex movement trajectories. In such instances, it may be desirable to utilize a cubic spline interpolation, such as that known for use in channel estimation in the LTE physical layer (PHY) using a limited number of pilot symbols. In an exemplary embodiment, the present systems and methods may further adapt the interpolated curve smoothing results of this technique to mobility prediction model 800 to reconstruct the movement trajectory of a mobile device, and thereby accurately predict the most-likely future position of the device with high accuracy.

In an exemplary embodiment, a cubic spline algorithm may be constructed from mobility prediction model 800 according to:

$$S(t) = \begin{cases} S_0(t) = a_0 t^3 + b_0 t^2 + c_0 t + d_0, \ t \in [\ t_0 \ \ t_1\ ] \\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ ... \\ S_i(t) = a_i t^3 + b_i t^2 + c_i t + d_i, \ t \in [\ t_{i-1} \ \ t_i\ ] \\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ ... \\ S_{N-1}(t) = a_{N-1} t^3 + b_{N-1} t^2 + c_{N-1} t + d_{N-1}, \ t \in [\ t_{N-1} \ \ t_N\ ] \end{cases}$$ (Eq. 5)

which satisfy $$\begin{cases} S_{i-1}(t_i) = S_i(t_i) = s_i \\ \ \ \ \ \ \ \ \ \ \ \ \ ... \\ S'_{i-1}(t_i) = S'_i(t_i) \\ \ \ \ \ \ \ \ \ \ \ \ \ ... \\ S''_{i-1}(t_i) = S''_i(t_i) \end{cases}$$ (Eq. 6)

and $$\begin{cases} S'_i(t_i) = \frac{s_i - s_{i-1}}{t_i - t_{i-1}} \\ S''_i(t_i) = \frac{s'_i(t_i) - s'_i(t_{i-1})}{t_i - t_{i-1}}, \\ \ \ \ \ \ \ \ \ \ \ \ \ ... \end{cases}$$ (Eq. 7)

where $S_i(t)$ indicates the piecewise interpolation function, and $s_i$ represents the historical movement position samples. From Eqs. 5-7, and for the spline function being estimated at every time section $[t_{i-1} \ t_i]$, the next device position $\hat{s}_{i+1}$ at time $t_{i+1}$ may be accurately predicted by $\hat{s}_{i+1} = S_i(t_{i+1})$.

Polynomial Nonlinear Regression

As described above, interpolation algorithms provide an effective technique for predicting next possible device positions with a nonlinear dependency from historical location information. In some cases though, such deterministic modeling techniques are generally more useful for single-target movement predictions, and based on assumptions that the obtained historical location samples are precisely accurate, without positional deviations and sampling noise. The accuracy of such predictions may decline in the case of a cluster of targets, and where each historical location sample from each target in the cluster may further contain multiple location points. In such cases, the present embodiments further adapt innovative regression techniques configured to utilize statistical information of the historical location samples to fit movement trajectories that minimize deviations between the sample clusters and the determined curves.

In an embodiment, an exemplary polynomial nonlinear regression technique for mobility prediction model 800 is provided, which may further utilizing least square fitting. According to this regression technique, a $k^{th}$ degree polynomial of a time section $[t_1 \ t_n]$ may be represented as:

$$S(t) = a_0 + a_1 t + ... + a_k t^k$$ (Eq. 8)

Assuming that there are n position samples $[(s_1,t_1), (s_2,t_2), ..., (s_n,t_n)]$ inside the time section $[t_1 \ t_n]$, coefficients $[a_0, a_1, ..., a_k]$ may then be estimated based on the least square fit according to:

$$\begin{bmatrix} 1 & t_1 & \cdots & t_1^k \\ 1 & t_2 & \cdots & t_2^k \\ \vdots & \vdots & \ddots & \vdots \\ 1 & t_n & \cdots & t_n^k \end{bmatrix} \begin{bmatrix} a_0 \\ a_1 \\ \vdots \\ a_k \end{bmatrix} = \begin{bmatrix} s_0 \\ s_1 \\ \vdots \\ s_k \end{bmatrix} \rightarrow \Gamma a = s,$$ (Eq. 9)

and where:

$$a = (\Gamma^T \Gamma)^{-1} \Gamma^T s$$ (Eq. 10)

From Eqs. 9 and 10, the next the predicted position may be thus be calculated as $\hat{s}_{n+1} = S(t_{n+1})$. It may be noted that, different from the LMS adaptive filter and cubic spline interpolation techniques, according to this regression technique, a more accurate statistical property estimation may be obtained in one period of time section as more data samples are used to determine the polynomial nonlinear regression. Thus, as more data samples are used for this regression technique, the fitting may be realized that much more precisely. An exemplary embodiment for implementing any or all of these algorithmic techniques is described further below with respect to FIG. 10.

Figure 10:
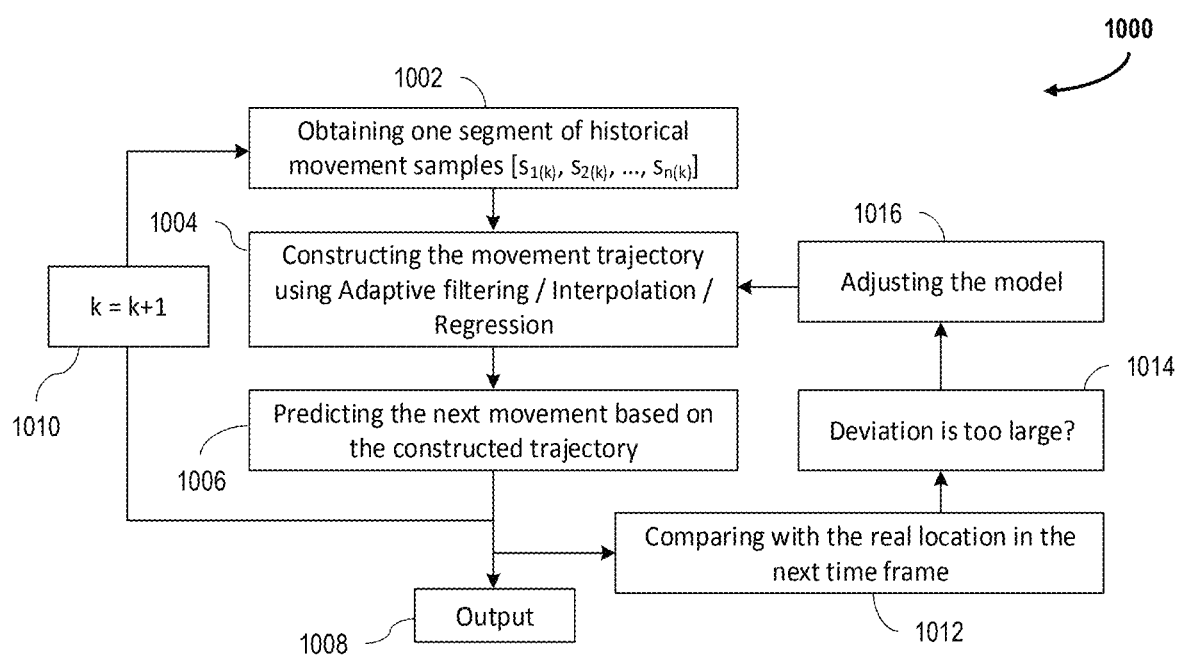
FIG. 10 is a flow diagram depicting an exemplary mobility prediction process, in accordance with an embodiment.

FIG. 10 is a flow diagram depicting an exemplary mobility prediction process 1000. In an exemplary embodiment, process 1000 may utilize a regression technique with respect to mobility prediction model 800, FIG. 8, and may be further implemented, for example, with respect one or more of the embodiments described above. Unless otherwise described to the contrary, some or all of the following steps of process 1000 may be performed simultaneously, or in a different order, and more or fewer steps may be performed without departing from the scope herein.

In operation, process 1000 begins at step 1002, in which process 1000 obtains at least one segment $[s_{1(k)}, s_{2(k)}, ..., s_{n(k)}]$ of historical movement position samples. In step 1004, process 1000 algorithmically constructs the movement trajectory of a mobile device utilizing at least one of the adaptive filtering, interpolation, and regression techniques described above. In step 1006, process predictively calculates the estimated next position of the mobile device according to the particular algorithmic technique(s) selected. In step 1008, process 1008 outputs the predicted next position of the mobile device, which may then be used for node handover selection, beamforming sweeps, and/or traffic management systems, etc., as described above. In step 1010, upon outputting the predicted next position in step 1008, process increments the iteration number (k) by one, and then returns to step 1002, to repeat process 1000 for the next position prediction of the mobile device.

Also after outputting the predicted next position in step 1008, and prior to executing step 1004 of the repeated execution of process 1004 for the next k iteration, process 1012 simultaneously proceeds to step 1012, in which the predicted next position output in step 1008 is compared with the actual position of the mobile device measured at the next time value. In step 1014, process 1000 compares the predicted position, i.e., determined at time $t_i$, with the actual location of the device determined at time $t_{i+1}$, and calculates a deviation value from the comparison. In step 1016, process adjusts the predictive mobility model, and returns to step 1004 of the next iteration.

In an exemplary embodiment of step 1016, the deviation value is compared with a predetermined threshold value and, if the deviation value is greater than the predetermined threshold, process 1000 may adjust the predictive mobility model prior to executing the selected algorithmic technique of the next iteration of step 1004. If the deviation value is below the threshold, process 1000 may leave the model unchanged for the next prediction. In some embodiments, if the deviation value is too large (e.g., greater than the threshold), a processor implementing process 1000 may be configured to adjust the prediction model to improve the prediction performance by (i) tuning the model parameters, (ii) changing the selected algorithm, and/or (iii) using a different, or additional algorithm.

In an exemplary embodiment, for every iteration of process 1000, one or more of the selected algorithmic techniques may utilize n historical position samples [$(s_1,t_1)$, $(s_2,t_2)$, ..., $(s_n,t_n)$] for an estimation of the next most-likely device position $\hat{s}_{n+1}$ at time $t_{n+1}$. In this case, after receiving one new position sample, the obtained history samples (e.g., in a memory) will increment to [$(s_2,t_2)$, $(s_3,t_3)$, ..., $(s_{n+1},t_{n+1})$], such that the next iteration of process 1000 will estimate the next most-likely device position for $\hat{s}_{n+2}$ at time $t_{n+2}$.

The person of ordinary skill in the art will appreciate that the iterative mobility prediction functionality of process 1000 is not limited to the particular algorithmic techniques described above, other predictive mobility algorithms may be utilized without departing from the scope herein, and which may be selected according to the real-world conditions and system requirements of the particular implementation.

FIGS. 11A-C are graphical illustrations depicting mobility prediction emulation results 1100, 1102, 1104, respectively. The results illustrated in FIGS. 11A-C were obtained by recording movement data utilizing a "Walkermeter" application on an IOS-based mobile electronic device. For each of emulation results 1100, 1102, 1104, a data set of 721 location samples was obtained for a continuous movement of the mobile device along a pathway for approximately 12 minutes. In these emulations, each pair of adjacent data samples indicates a time separation of 1 second, and each predicted position was estimated using the five most recently obtained actual position samples.

Accordingly, each of the three predictive mobility algorithms described above were respectively tested to produce emulation results 1100, 1102, 1104. More specifically, FIG. 11A depicts emulation results 1100 obtained through implementation of an LMS adaptive filtering technique, FIG. 11B depicts emulation results 1102 obtained through implementation of a cubic spline interpolation technique, and FIG. 11C depicts emulation results 1104 obtained through implementation of a polynomial nonlinear regression technique. As shown in enlarged local portions 1106, 1108, and 1110 of emulation results 1100, 1102, 1104, respectively, all of the predictive algorithms provided positional estimates that closely track with the actual positional information subsequently confirmed in the next time iterations with slight deviations occurring at sharper turns in the path of the mobile device.

According to the embodiments described herein, the enhanced systems and methods for mobility prediction significantly improve, in comparison with conventional techniques, position awareness for both present and future RANs, which further improve many additional aspects of radio access performance therein. The present techniques provide useful mobility prediction using both general estimation algorithms, as well as the particular algorithms described above implementing LMS adaptive filtering, cubic spline interpolation, and/or polynomial nonlinear regression as the core algorithm for user mobility prediction.

The emulation results depicted in FIGS. 11A-C demonstrate a particular efficiency level for the limited data samples taken over a relatively short-duration time period. The efficiency is expected to further improve with a greater number of data samples obtained, and over longer durations. It may be noted though, that for mobility prediction techniques in a communication system requiring fast responses, and which provide relatively short decision/calculation periods, the number of data samples that may be obtained may be more limited. Accordingly, it may be desirable to forego additional large-scale training subprocesses for particular high-performance network mobility scenarios.

Exemplary embodiments of systems and methods for enhanced cellular network handovers are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized in connection with other managed communication networks.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

The invention claimed is:

1. A wireless electronic device in communication with a first communication node of a wireless communication network, and configured to operably connect with at least one of a second communication node and a third communication node of the wireless communication network, comprising:

a processor; and a memory configured to store computer-executable instructions therein, which, when executed by the processor, cause the wireless electronic device to:

obtain, at a first discrete time, (i) a speed of movement, (ii) a direction of travel, and (iii) a first location of the wireless electronic device;

determine a first signal strength of the second communication node and a second signal strength of the third communication node, wherein the second signal strength is greater than the first signal strength;

estimate, relative to the obtained first location, the speed of movement and the direction of travel at a second location of the wireless electronic device, different from the first location, at a second discrete time subsequent to the first discrete time;

confirming that the second location is within a transmission range of the second communication node; and preempting a handover to the third communication node of the wireless electronic device at the second location by performing, prior to the second discrete time, a handover of the wireless electronic device directly from the first communication node to the second communication node.

2. The device of claim 1, comprising a user equipment device (UE).

3. The device of claim 1, wherein the first, second, and third communication nodes include at least one of a radio access network (RAN), a cellular base station, a small cell, a macro cell, an evolved node B (eNB), and a gNB.

4. The device of claim 1, wherein the wireless communication network is configured to communicate according to at least one of a 3GPP, 4G, 5G, 5G New Radio (5GNR), and 6G technical standard.

5. The device of claim 4, wherein the instructions further cause the wireless electronic device to communicate according to a long term evolution (LTE) protocol.

6. The device of claim 1, wherein the instructions further cause the wireless electronic device to communicate the speed of movement, direction of travel, and first location directly to the first communication node.

7. The device of claim 1, wherein the instructions further cause the wireless electronic device to obtain the speed of movement and direction of travel by sampling a plurality of previous locations of the wireless electronic device at a plurality of discrete times, respectively, prior to the first discrete time, to generate a historical series of discrete location samples.

8. The device of claim 7, wherein each sample in the historical series includes an X-Y coordinate location and a discrete time that the particular sample was obtained.

9. The device of claim 7, wherein the instructions further cause the wireless electronic device to estimate the speed of movement and the direction of travel at the second location based on a movement trajectory constructed from the historical series.

10. The device of claim 9, wherein the instructions further cause the wireless electronic device to calculate the movement trajectory according to a mobility prediction model algorithm including at least one of a least mean-square (LMS) adaptive filtering technique, a cubic spline interpolation technique, and a polynomial nonlinear regression technique.

11. A network core for a wireless communication network including a first communication node, a second communication node, and a third communication node each configured to operably communicate with of a wireless electronic device within communication range of the respective communication node, the network core comprising:

a processor; and a memory configured to store computer-executable instructions therein, which, when executed by the processor, cause the network core to:

obtain, at a first discrete time, (i) a speed of movement, (ii) a direction of travel, and (iii) a first location of the wireless electronic device;

determine (i) a first signal strength of the second communication node relative to the wireless electronic device, and (ii) a second signal strength of the third communication node relative to the wireless electronic device, wherein the second signal strength is greater than the first signal strength;

estimate, relative to the obtained first location, the speed of movement and the direction of travel at a second location of the wireless electronic device, different from the first location, at a second discrete time subsequent to the first discrete time;

confirming that the second location is within the communication range of the second communication node; and preempting a handover of the wireless electronic device at the second location to the third communication node by causing, prior to the second discrete time, a handover of the wireless electronic device directly from the first communication node to the second communication node.

12. The network core of claim 11, further comprising at least one of a mobile core and an evolved packet core (EPC).

13. The network core of claim 11, further comprising a mobility management entity (MME) and a serving gateway (SGW).

14. The network core of claim 13, further comprising one or more of a packet data network gateway (PGW), a policy control and charging rules function (PCRF) unit, and a home subscriber server (HSS).

15. The network core of claim 11, wherein the first, second, and third communication nodes include at least one of a radio access network (RAN), a cellular base station, a small cell, a macro cell, an evolved node B (eNB), and a gNB.

16. The network core of claim 11, wherein the wireless communication network is configured to communicate according to at least one of a 3GPP, 4G, 5G, 5G New Radio (5GNR), and 6G technical standard, and wherein the wireless electronic device is configured to communicate according to a long term evolution (LTE) protocol.

17. A first communication node of a wireless communication network including a second communication node and a third communication node, each of the first, second, and third communication nodes configured to operably communicate with a wireless electronic device located within a transmission range of that respective communication node, the first communication node comprising:

a processor; and a memory configured to store computer-executable instructions therein, which, when executed by the processor, cause the first communication node to:

operably connect with the wireless electronic device at a first discrete time;

obtain, at the first discrete time, (i) a speed of movement, (ii) a direction of travel, and (iii) a first location of the wireless electronic device, wherein the first location is within a transmission range of the first communication node;

determine (i) a first signal strength of the second communication node relative to the wireless electronic device, and (ii) a second signal strength of the third communication node relative to the wireless electronic device, wherein the second signal strength is greater than the first signal strength;

estimate, relative to the obtained first location, the speed of movement and the direction of travel at a second location of the wireless electronic device, different from the first location, at a second discrete time subsequent to the first discrete time;

confirm that the second location is within the communication range of the second communication node; and perform, prior to the second discrete time, a handover of the wireless electronic device directly to the second communication node based on the estimated speed of movement and the direction of travel at the second location of the wireless electronic device.

18. The first communication node of claim 17, further comprising at least one of a radio access network (RAN), a cellular base station, a small cell, a macro cell, an evolved node B (eNB), and a gNB.

19. The first communication node of claim 17, wherein the wireless communication network is configured to communicate according to at least one of a 3GPP, 4G, 5G, 5G New Radio (5GNR), and 6G technical standard, and wherein the wireless electronic device is configured to communicate according to a long term evolution (LTE) protocol.

20. The first communication node of claim 17, wherein the instructions further cause the first communication node to obtain the speed of movement and direction of travel of the wireless electronic device at the first location by at least one of (i) direct communication from the wireless electronic device, and (i) sampling a plurality of previous locations of the wireless electronic device at a plurality of discrete times, respectively, prior to the first discrete time, to generate a historical series of discrete location samples.

* * * * *